United States Patent [19]

Kuribara et al.

[11] Patent Number: 4,993,391

[45] Date of Patent: Feb. 19, 1991

[54] FUEL SUPPLY CONTROL SYSTEM FOR INTERNAL COMBUSTION ENGINE

[75] Inventors: Masaru Kuribara; Kazumitsu Kobayashi, both of Gunma, Japan

[73] Assignee: Japan Electronic Control Systems Company Limited, Isezaki, Japan

[21] Appl. No.: 514,039

[22] Filed: Apr. 27, 1990

[30] Foreign Application Priority Data

Apr. 27, 1989 [JP] Japan ............................. 1-50623[U]

[51] Int. Cl.⁵ .................................... F02M 37/10
[52] U.S. Cl. .................................. 123/482; 123/1 A; 123/478; 123/497
[58] Field of Search ............... 123/1 A, 457, 458, 478, 123/482, 494, 497, 498, 499

[56] References Cited

U.S. PATENT DOCUMENTS

| | | | |
|---|---|---|---|
| 3,470,858 | 10/1969 | Mycroft | 123/482 |
| 4,284,053 | 8/1981 | Merrick | 123/482 X |
| 4,508,077 | 4/1985 | Shimbara | 123/482 X |

Primary Examiner—Tony M. Argenbright
Attorney, Agent, or Firm—Foley & Lardner, Schwartz, Jeffery, Schwaab, Mack, Blumenthal & Evans

[57] ABSTRACT

In a fuel supply control system for an internal combustion engine, a voltage value to be applied to a fuel pump is controlled depending on a monitored alcohol concentration contained in a fuel to allow the fuel pump to supply a controlled amount of the fuel which is determined based on the monitored alcohol concentration contained in the fuel.

6 Claims, 4 Drawing Sheets

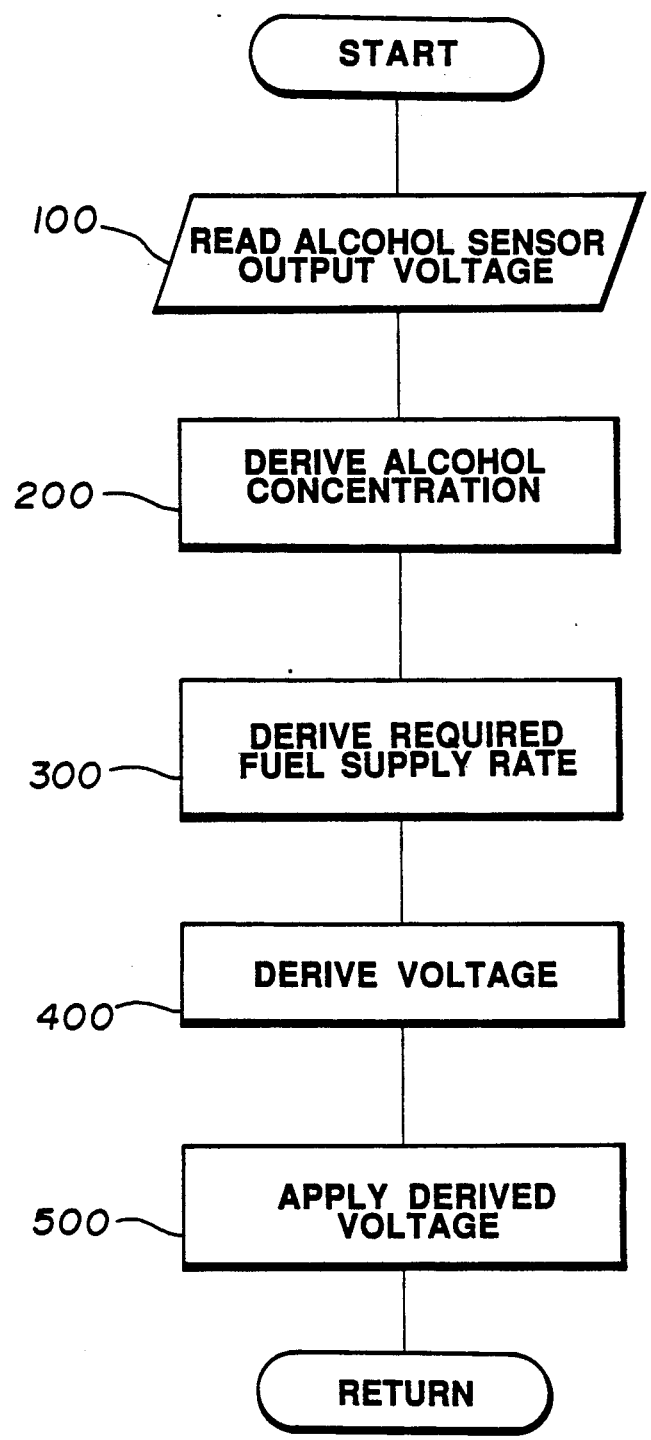

FUEL SUPPLY CONTROL SYSTEM FOR INTERNAL COMBUSTION ENGINE

BACKGROUND OF THE INVENTION

1. Field of the Invention

The present invention generally relates to a fuel supply control system for an internal combustion engine, and more specifically, to such a fuel supply control system, wherein a fuel containing alcohol concentration of 0 to 100% is selectively used, that can drive a fuel pump with a controlled voltage value which is variable depending on a monitored alcohol concentration contained in the fuel, so as to allow the fuel pump to supply a controlled amount of the fuel which is determined based on the monitored alcohol concentration contained in the fuel.

2. Description of the Background Art

An alcohol internal combustion engine has been proposed, wherein a gasoline/alcohol, such as methanol, mixture fuel is used in place of a pure gasoline fuel.

In the alcohol internal combustion engine, an alcohol sensor is provided for monitoring alcohol concentration contained in the mixture fuel to control a fuel injection amount and an ignition timing based on a monitored alcohol concentration. Naturally, the fuel injection amount and the ignition timing are both variable depending on the alcohol concentration because an octane value contained in the gasoline fuel and the alcohol fuel is different from each other. Further, an oxygen sensor is provided as in the pure gasoline engine for monitoring oxygen concentration contained in an exhaust gas so as to perform a FEEDBACK or CLOSED LOOP control of the fuel injection amount to maintain an air/fuel ratio of an air/fuel mixture at a stoichiometric value in a predetermined engine driving range.

In case of the pure gasoline fuel, a fuel injection amount $T_i$ is derived based on the following equation (1) which is well known in the art:

$$T_i = T_p \times L_{ambda} \times L_{ambda}' \times C_{oef} + T_s \qquad (1)$$

where, $T_p$ is a basic fuel injection amount derived based on an engine speed and an engine load (an intake air flow rate, for example), $L_{ambda}$ is a FEEDBACK air/fuel ratio dependent correction coefficient derived based on an output signal from the oxygen sensor, $L_{ambda}'$ is a learnt correction coefficient derived based on the FEEDBACK air/fuel ratio dependent correction coefficient $L_{ambda}$ and the corresponding engine speed and engine load, $C_{oef}$ is a correction coefficient derived based on various engine operation parameters, such as an engine coolant temperature, and $T_s$ is a correction amount derived based on a battery voltage.

By utilizing the above-noted equation (1), the air/fuel ratio of the air/fuel mixture is controlled to be at the stoichiometric value of 14.7 under the predetermined engine driving range in case of the pure gasoline fuel, i.e. in case of the fuel containing an alcohol concentration of 0%.

On the other hand, in case of the pure alcohol fuel, such as the fuel containing a methanol concentration of 100%, the stoichiometric air/fuel ratio is 6.5 as illustrated in FIG. 6, which is less than a half of that of the pure gasoline fuel.

Accordingly, a fuel injection amount $T_i$ of the pure alcohol fuel or the gasoline/alcohol mixture fuel is derived by the following equation (2) which is also known in the art:

$$T_i \times C_k \times T_p \times L_{ambda} \times L_{ambda}' \times C_{oef} + T_s \qquad (2)$$

where, $C_k$ is an alcohol concentration dependent constant.

As noted above, since the stoichiometric air/fuel ratio of the pure methanol fuel is less than a half of that of the pure gasoline engine, a fuel pump should supply an amount of the pure alcohol fuel to a fuel injection valve twice as much as that of the pure gasoline fuel. In order to satisfy this requirement, a voltage value of 12 V is set to be applied to the fuel pump, while a voltage value of 8 V is sufficient or optimum in case of the pure gasoline fuel. Accordingly, when the voltage value of 12 V is always set to be applied to the fuel pump, it is wasteful in view of electric power supplied when the fuel containing a less alcohol concentration is used for driving the engine, and further, a noise generated due to a constant high speed operation of the fuel pump becomes a problem.

SUMMARY OF THE INVENTION

Therefore, it is an object of the present invention to provide a fuel supply control system for an internal combustion engine, wherein a fuel containing alcohol concentraion of 0 to 100% is selectively used, that can eliminate the above-noted defect inherent in the background art.

It is another object of the present invention to provide a fuel supply control system for an internal combustion engine, wherein a fuel containing alcohol concentration of 0 to 100% is selectively used, that can drive a fuel pump with a controlled voltage value which is variable depending on a monitored alcohol concentration contained in the fuel, so as to allow the fuel pump to supply a controlled amount of the fuel which is determined based on the monitored alcohol concentration contained in the fuel.

To accomplish the above mentioned and other objects, according to one aspect of the present invention, a fuel supply control system for an internal combustion engine comprises:

a fuel tank which stores a fuel therein:

a fuel pump associated with the fuel tank to pressurize the fuel and supply same into a fuel line which is connected to fuel feed means at its downstream end, the fuel feed means feeding a controlled amount of the fuel to be combusted in engine combustion chamber means, the fuel pump adapted to vary its discharge rate depending on a voltage value applied thereto;

sensor means for monitoring an alcohol concentration contained in the fuel to produce a signal indicative of the monitored alcohol concentration;

first means for deriving the voltage value to be applied to the fuel pump based on a value of the alcohol concentration indicative signal;

second means, responsive to the first means, for applying the derived voltage value to the fuel pump to allow the latter to supply a controlled amount of the fuel which corresponds to the value of the alcohol concentration indicative signal.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings:

FIG. 5 is a flowchart of a voltage control routine to be executed by a control unit shown in FIG. 1.

DESCRIPTION OF THE PREFERRED EMBODIMENT

Now, a fuel supply control system for an internal combustion engine according to a preferred embodiment of the present invention will be described hereinbelow with reference to FIGS. 1 to 5.

Figure 1:
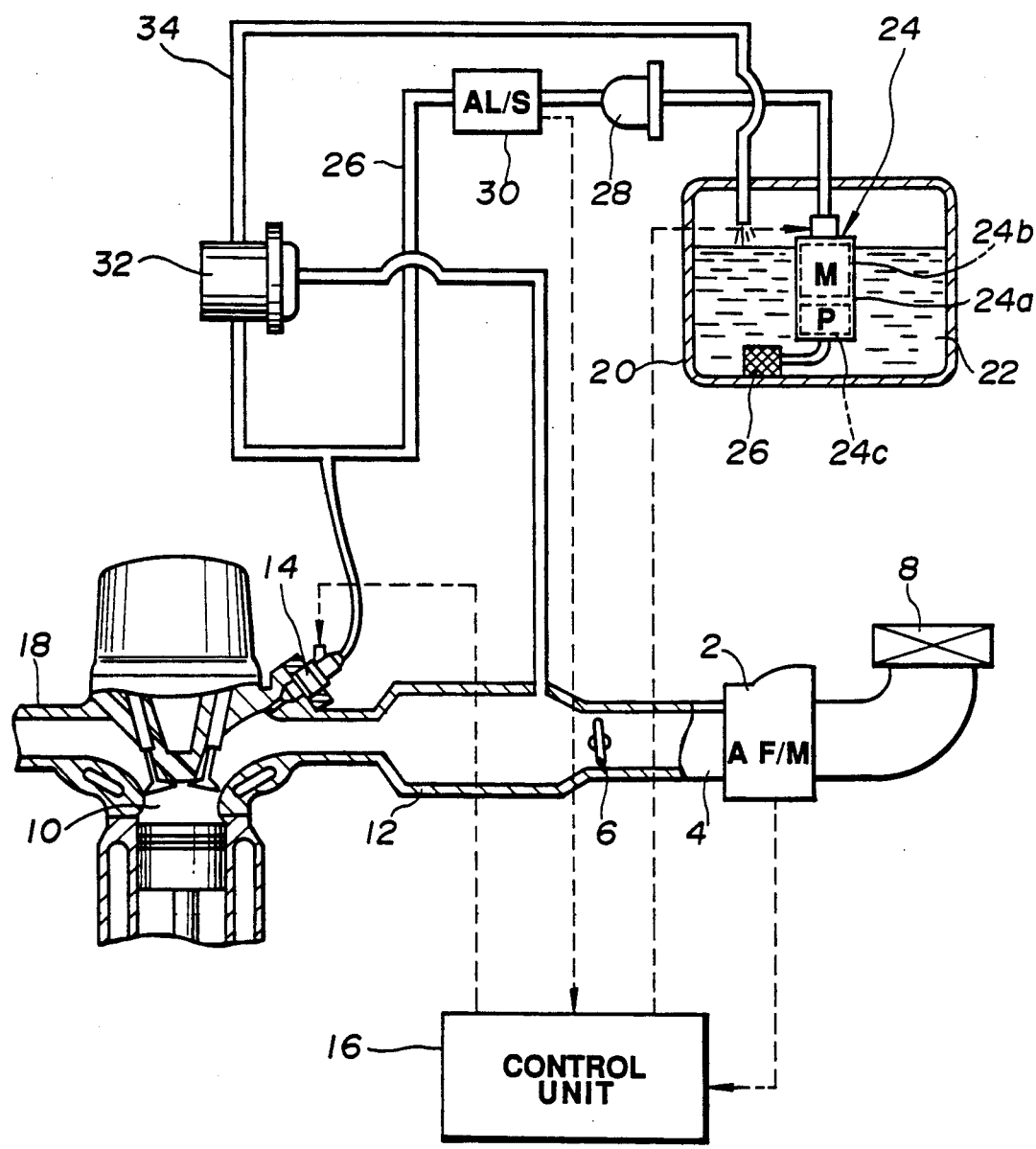
FIG. 1 is a schematic view showing an overall structure of a fuel supply control system for an internal combustion engine according to a preferred embodiment of the present invention.

FIG. 1 shows an overall structure of the fuel supply control system according to the preferred embodiment of the present invention. In FIG. 1, an air-flow meter 2 is provided in an induction passage 4 upstream of a throttle valve 6 for monitoring a flow rate of an intake air which is introduced into the induction passage 4 through an air cleaner 8 and conducted into respective engine combustion chambers 10 through the throttle valve 6 and for producing a signal indicative of the monitored intake air flow rate. The throttle valve 6 is interconnected with an accelerator pedal (not shown) so as to adjust the intake air flow rate passing therethrough depending on an accelerator pedal position. In an intake manifold 12 arranged downstream of the throttle valve 6 is disposed an electro-magnetic fuel injection valve 14 per each engine combustion chamber. The fuel injection valve 14 is controlled to open in response to an injection pulse signal output from a control unit 16 to eject the pressurized fuel into the intake manifold 12 so as to form an air/fuel mixture to be fed to the engine combustion chambers. An opening time of the fuel injection valve 14 or a fuel injection time is determined by a pulse width of the injection pulse signal which is derived by the control unit 16 based on the aforementioned equation (2). In an exhaust passage arranged downstream of an exhaust manifold 18, an oxygen sensor (not shown) is provided for monitoring oxygen concentration contained in an exhaust gas passing through the exhaust passage to produce a signal indicative of the monitored oxygen concentration. This signal is used for the FEEDBACK control of the air/fuel ratio in a predetermined engine driving range to maintain the air/fuel ratio at the stoichiometric value.

Figure 4:
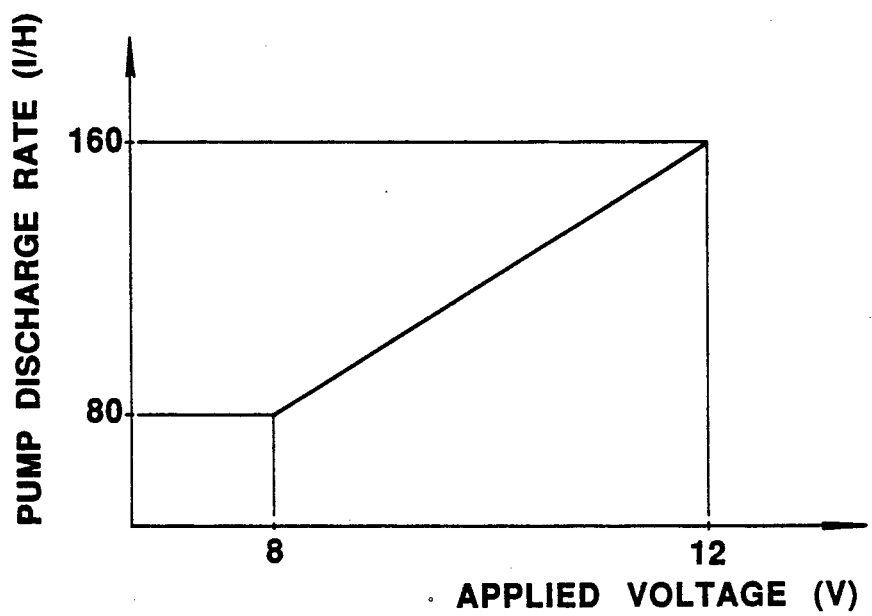
FIG. 4 is a graph showing a relationship between a voltage value applied to a fuel pump and a corresponding fuel discharge rate of the fuel pump.
Figure 6:
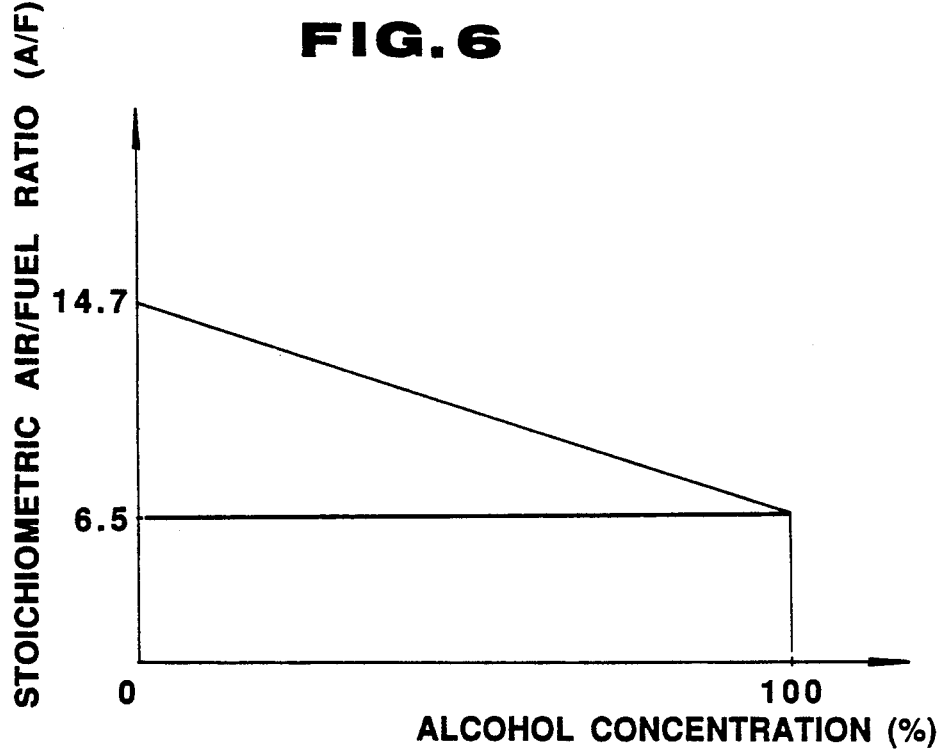
FIG. 6 is a graph showing a relationship between an alcohol concentration contained in a fuel and a corresponding stoichiometric air/fuel ratio of an air/fuel mixture.

A fuel tank 20 stores a fuel 22 with selective alcohol concentration of 0 to 100% contained therein. In this preferred embodiment, methanol is used as an alcohol component. In the fuel tank 20, a fuel pump generally designated by a reference numeral 24 is provided which supplies the pressurized fuel to the fuel injection valve 14 through a fuel line 26. The fuel pump 24 includes a casing 24a in which a direct current (D.C.) motor 24b and a pump section 24c are arranged. The D.C. motor 24b is energized by a controlled voltage applied from a vehicular battery (not shown) to drive the pump section 24c for sucking the fuel stored in the fuel tank 20 into the driven pump section 24c through a fuel filter 26 and pressuring the sucked fuel to be discharged into the fuel line 26. The D.C. motor 24b is designed to vary its output depending on the applied voltage from the vehicular battery. Accordingly, a discharge rate or a fuel supply rate of the fuel pump 24 is variable depending on the applied voltage as shown in FIG. 4 which shows a graph of applied voltage V versus fuel discharge rate (l/H).

In the fuel line 26, a fuel filter 28 is provided for further filtering the pressurized fuel. An alcohol sensor 30 is further provided in the fuel line 26 downstream of the fuel filter 28 for monitoring alcohol concentration contained in the fuel and producing a signal indicative of the monitored alcohol concentration which is fed to the control unit 16. The alcohol sensor 30 may be of any known types, such as, a resistance type, a capacitance type and an optical type. A pressure regulator 32 is further provided at a downstream end of the fuel line 26 so as to release an excessive fuel back into the fuel tank 20 through a return line 34 for controlling a pressure difference between the fuel line 26 and the intake manifold 12 to be constant.

The control unit 16 includes a microcomputer having CPU, RAM, ROM and an input/output circuit as in the known way. The control unit 16 processes various signals indicative of respective engine operation parameters fed from various sensors, such as, the alcohol sensor 30, the air flow meter 2, the oxygen sensor (not shown) and other sensors (not shown) to derive a fuel injection amount $T_i$ based on the aforementioned equation (2). The control unit 16 further executes a routine as illustrated in FIG. 5 to control a value of the voltage to be applied to the fuel pump 24 depending on the monitored alcohol concentration contained in the fuel 22 which is monotored by the alcohol sensor 30.

Figure 2:
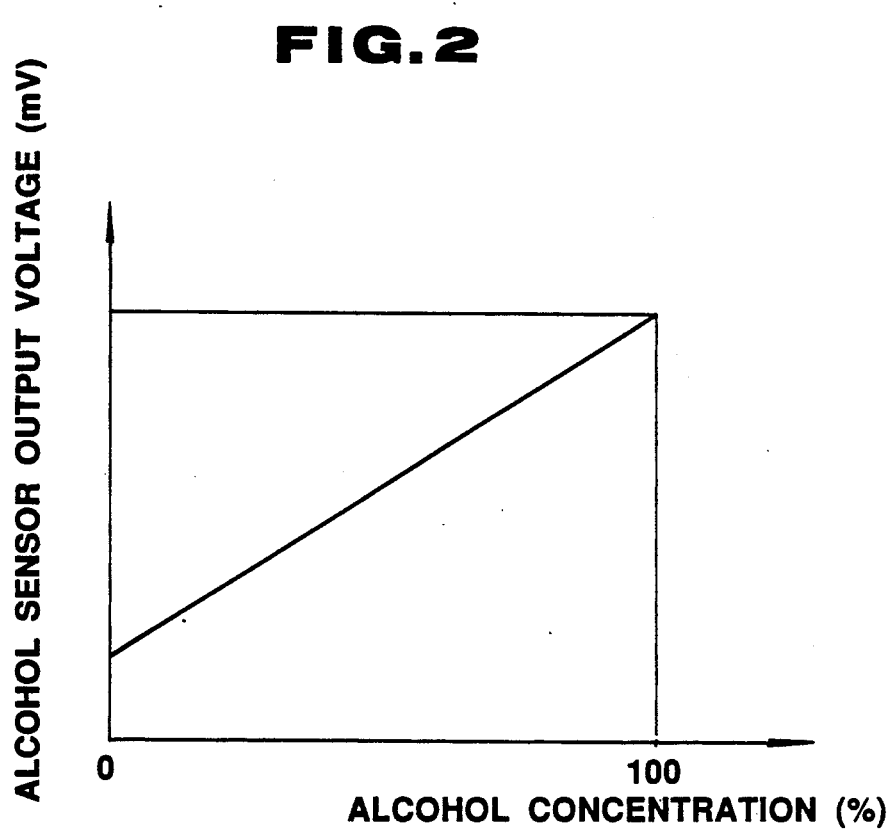
FIG. 2 is a graph showing a relationship between an alcohol concentration contained in a fuel and a corresponding alcohol sensor output voltage.

FIG. 5 shows a flowchart of the voltage control routine to be executed by the control unit 16. At a first step 100, an output value of the alcohol sensor 30 is read out, and at a subsequent step 200, an alcohol concentration of the fuel 22 to be fed to the fuel injection valve 14 is derived based on an alcohol concentration versus alcohol sensor output voltage map which is stored in ROM and is illustrated in FIG. 2 in the form of a diagram for better understanding. As seen in FIG. 2, the output value of the alcohol sensor 30 increases with increment of the alcohol concentration contained in the fuel 22.

Figure 3:
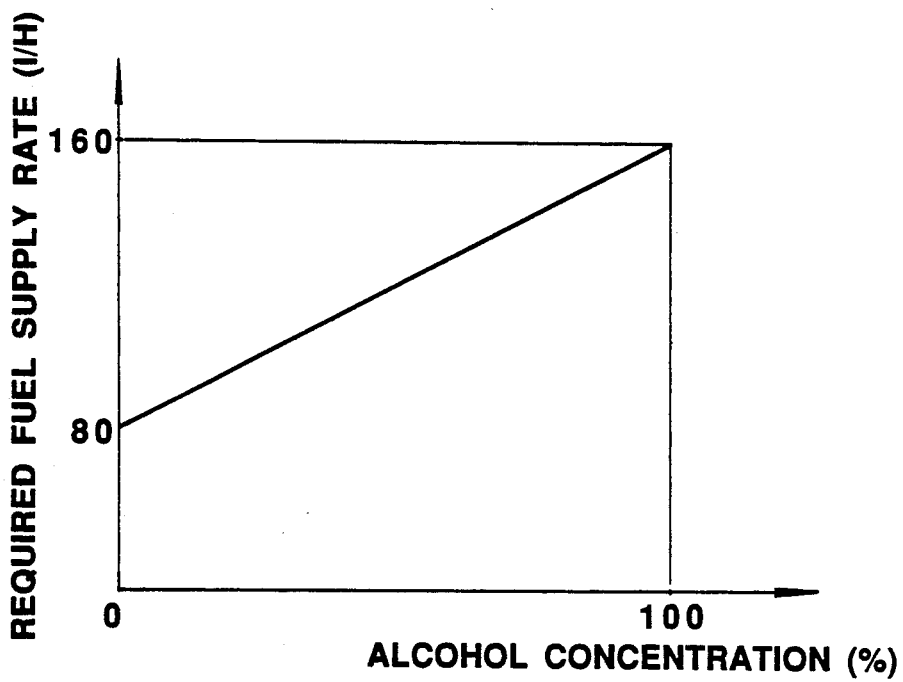
FIG. 3 is a graph showing a relationship between an alcohol concentration contained in a fuel and a corresponding required fuel supply rate.

At a subsequent step 300, a fuel supply rate to be fed to the fuel injection valve 14 from the fuel pump 24 is derived based on an alcohol concentraion versus fuel supply rate map which is stored in ROM and is illustrated in FIG. 3 in the form of a diagram for better understanding. As seen in FIG. 3, a required fuel supply rate increases with increment of the alcohol concentration contained in the fuel 22.

Subsequently, at a step 400, a voltage value to be applied to the D.C. motor 24b of the fuel pump 24 is derived based on an applied voltage versus fuel discharge rate map which is stored in ROM and is illustrated in FIG. 4 in the form of a diagram for better understanding. As seen in FIG. 4, the fuel discharge rate of the fuel pump 24 varies depending on the voltage applied to the fuel pump 24. Accordingly, when the required fuel supply rate is determined at the step 300, the required voltage to be applied to the fuel pump 24 can be derived using the applied voltage versus fuel discharge rate map. For example, when the alcohol concentration of the fuel 22 is 0%, i.e. in case of the pure gasoline fuel, a voltage value of 8 V is determined at the step 400 as clearly seen from FIGS. 3 and 4. On the other hand, when the alcohol concentration of the fuel 22 is 100%, i.e. in case of the pure methanol fuel, a voltage value of 12V is determined at the step 400 since, as mentioned before, a required air/fuel ratio in case of the pure methanol fuel is less than a half of that required in case of the pure gasoline fuel. As appreciated, a voltage value to be determined at the step 400 is variable between 8 V and 12 V depending on the required fuel supply rate derived at the step 300.

Finally, at a step 500, the derived voltage value at the step 400 is applied to the D.C. motor 24b of the fuel pump 24 through the input/output circuit of the control unit 16 for allowing the fuel pump 24 to supply a corresponding required amount of the fuel to the fuel injection valve 14 through the fuel line 26.

In the foregoing preferred embodiment, the voltage value to be applied to the fuel pump 24 is controlled to be optimum depending on the monitored alcohol concentration, i.e. depending on the required fuel supply rate which is variable depending on the alcohol concentration contained in the fuel to be fed to the fuel injection valve 14. Accordingly, an optimum amount of the fuel is fed to the fuel injection valve 14 over the alcohol concentration range of 0 to 100% contained in the fuel, so that the aforementioned defects inherent in the background art is effectively eliminated.

It is to be understood that the invention is not to be limited to the embodiment described above, and that various changes and modifications may be made without departing from the spirit and scope of the invention as defined in the appended claims.

What is claimed is:

1. A fuel supply control system for an internal combustion engine, comprising:
   a fuel tank which stores a fuel therein;
   a fuel pump associated with said fuel tank to pressurize the fuel and supply same into a fuel line which is connected to fuel feed means at its downstream end, said fuel feed means feeding a controlled amount of the fuel to be combustioned in engine combusted chamber means, said fuel pump adapted to vary its discharge rate depending on a voltage value applied thereto;
   sensor means for monitoring an alcohol concentration contained in the fuel to produce a signal indicative of the monitored alcohol concentration;
   first means for deriving said voltage value to be applied to the fuel pump based on a value of said alcohol concentration indicative signal;
   second means, responsive to said first means, for applying said derived voltage value to the fuel pump to allow the latter to supply a controlled amount of the fuel which corresponds to the value of said alcohol concentration indicative signal.

2. A fuel supply control system as set forth in claim 1, wherein said second means includes third means for deriving an alcohol concentration based on said alcohol concentration indicative signal, fourth means, responsive to said third means, for deriving a required fuel supply rate to be fed to the fuel feed means based on said derived alcohol concentration, and fifth means, responsive to said fourth means, for deriving the voltage value to be applied to the fuel pump based on said derived required fuel supply rate.

3. A fuel supply control system as set forth in claim 2, wherein said third means includes sixth means for deriving the value of said alcohol concentration indicative signal, and seventh means, responsive to said sixth means, for deriving the alcohol concentration based on said value derived by the sixth means.

4. A fuel supply control system as set forth in claim 1, wherein said fuel feed means is a fuel injection valve.

5. A fuel supply control system as set forth in claim 1, wherein said sensor means is disposed in said fuel line.

6. A fuel supply control system as set forth in claim 1, wherein said fuel pump is provided in said fuel tank.

* * * * *